United States Patent
Khan (10) Patent No.: US 9,971,798 B2
(45) Date of Patent: May 15, 2018

(54) MANAGING DATA PROFILING OPERATIONS RELATED TO DATA TYPE

(71) Applicant: Ab Initio Technology LLC, Lexington, MA (US)

(72) Inventor: Muhammad Arshad Khan, Sharon, MA (US)

(73) Assignee: Ab Initio Technology LLC, Lexington, MA (US)

( * ) Notice: Subject to any disclaimer, the term of this patent is extended or adjusted under 35 U.S.C. 154(b) by 370 days.

(21) Appl. No.: 14/625,902

(22) Filed: Feb. 19, 2015

(65) Prior Publication Data
US 2015/0254292 A1   Sep. 10, 2015

Related U.S. Application Data

(60) Provisional application No. 61/949,477, filed on Mar. 7, 2014.

(51) Int. Cl.
*G06F 17/30* (2006.01)

(52) U.S. Cl.
CPC .. *G06F 17/30321* (2013.01); *G06F 17/30303* (2013.01); *G06F 17/30386* (2013.01)

(58) Field of Classification Search
USPC ....................................... 707/741, 770, 600
See application file for complete search history.

(56) References Cited

U.S. PATENT DOCUMENTS

| 5,179,643 A | 1/1993 | Homma et al. |
| 5,742,806 A | 4/1998 | Reiner et al. |

(Continued)

FOREIGN PATENT DOCUMENTS

| CN | 1314634 | 9/2001 |
| CN | 1749224 | 3/2006 |

(Continued)

OTHER PUBLICATIONS

Olsen, Jack E. Data Profiling Technology, Chapters 7 and 8) (23 pages) Jan. 2003.

(Continued)

*Primary Examiner* — Hung T Vy
(74) *Attorney, Agent, or Firm* — Occhiuti & Rohlicek LLP (57) ABSTRACT

Processing data in a computing system includes receiving a plurality of records that each have one or more values for respective fields of a plurality of fields. Data type information associates each of one or more data types with at least one identifier. Processing a plurality of data values from the records includes: generating a plurality of data units from the records, each data unit including a field identifier that uniquely identifies one of the fields and a binary value from one of the records, the binary value extracted from the field of that record identified by the field identifier; aggregating information about binary values from a plurality of the data units; generating a list of entries for each of one or more of the fields, at least some of the entries each including one of the binary values and information about that binary value aggregated from a plurality of the data units; retrieving a data type associated with a first identifier from the data type information, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

55 Claims, 4 Drawing Sheets

(56) References Cited

U.S. PATENT DOCUMENTS

| | | | |
|---|---|---|---|
| 5,842,200 A | 11/1998 | Agrawal et al. | |
| 5,845,285 A | 12/1998 | Klein | |
| 5,966,072 A | 10/1999 | Stanfill et al. | |
| 6,134,560 A | 10/2000 | Kliebhan | |
| 6,138,123 A | 10/2000 | Rathbun | |
| 6,163,774 A | 12/2000 | Lore et al. | |
| 6,343,294 B1 | 1/2002 | Hawlet | |
| 6,553,366 B1 | 4/2003 | Miller et al. | |
| 6,601,048 B1 | 7/2003 | Gavan et al. | |
| 6,657,568 B1 | 12/2003 | Coelho et al. | |
| 6,741,995 B1 | 5/2004 | Chen et al. | |
| 6,788,302 B1 | 9/2004 | Ditlow et al. | |
| 6,801,938 B1 | 10/2004 | Bookman et al. | |
| 6,839,682 B1 | 1/2005 | Blume et al. | |
| 6,959,300 B1 | 10/2005 | Caldwell et al. | |
| 7,013,290 B2 | 3/2006 | Ananian | |
| 7,031,843 B1 | 4/2006 | Bullard et al. | |
| 7,047,230 B2 | 5/2006 | Gibbons | |
| 7,058,819 B2 | 6/2006 | Okaue | |
| 7,117,222 B2 | 10/2006 | Santosuosso | |
| 7,359,847 B2 | 4/2008 | Gabele et al. | |
| 7,376,656 B2 | 5/2008 | Blakeley et al. | |
| 7,392,169 B2 | 6/2008 | Gabele et al. | |
| 7,403,942 B1 | 7/2008 | Bayliss | |
| 7,433,861 B2 | 10/2008 | Santosuosso | |
| 7,698,163 B2 | 4/2010 | Reed et al. | |
| 7,756,873 B2 | 7/2010 | Gould et al. | |
| 7,813,937 B1 | 10/2010 | Pathria et al. | |
| 7,849,075 B2 | 12/2010 | Gould et al. | |
| 7,904,464 B2 | 3/2011 | Golwalkar et al. | |
| 7,958,142 B2 * | 6/2011 | Li | G06Q 30/02 707/770 |
| 8,145,642 B2 | 3/2012 | Cruanes et al. | |
| 8,296,274 B2 | 10/2012 | Leppard | |
| 8,326,824 B2 | 12/2012 | Agrawal et al. | |
| 8,666,919 B2 | 3/2014 | Miranda et al. | |
| 9,323,748 B2 | 4/2016 | Anderson | |
| 9,336,246 B2 | 5/2016 | Gorelik et al. | |
| 2002/0073138 A1 | 6/2002 | Gilbert et al. | |
| 2002/0120602 A1 | 8/2002 | Overbeek et al. | |
| 2002/0161778 A1 | 10/2002 | Linstedt | |
| 2002/0198877 A1 | 12/2002 | Wolff et al. | |
| 2003/0023868 A1 | 1/2003 | Parent | |
| 2003/0033138 A1 | 2/2003 | Bangalore et al. | |
| 2003/0140027 A1 | 7/2003 | Huttel et al. | |
| 2004/0023666 A1 | 2/2004 | Moon et al. | |
| 2004/0049492 A1 | 3/2004 | Gibbons | |
| 2004/0073534 A1 | 4/2004 | Robson | |
| 2004/0083199 A1 | 4/2004 | Govindugari et al. | |
| 2004/0111410 A1 | 6/2004 | Burgoon et al. | |
| 2004/0181514 A1 | 9/2004 | Santosuosso | |
| 2004/0181533 A1 | 9/2004 | Santosuosso | |
| 2004/0249810 A1 | 12/2004 | Das et al. | |
| 2004/0260711 A1 | 12/2004 | Chessell et al. | |
| 2005/0048564 A1 | 3/2005 | Emili | |
| 2005/0055369 A1 | 3/2005 | Gorelik et al. | |
| 2005/0065914 A1 | 3/2005 | Chang et al. | |
| 2005/0071320 A1 | 3/2005 | Chkodrov et al. | |
| 2005/0102325 A1 | 5/2005 | Gould | |
| 2005/0114368 A1 | 5/2005 | Gould et al. | |
| 2005/0114369 A1 | 5/2005 | Gould et al. | |
| 2005/0154715 A1 * | 7/2005 | Yoaz | G06F 7/00 |
| 2005/0177578 A1 | 8/2005 | Chen et al. | |
| 2005/0192994 A1 | 9/2005 | Caldwell et al. | |
| 2005/0240354 A1 | 10/2005 | Mamou | |
| 2006/0041544 A1 | 2/2006 | Santosuosso | |
| 2006/0069717 A1 | 3/2006 | Mamou | |
| 2006/0294055 A1 | 12/2006 | Santosuosso | |
| 2007/0050381 A1 | 3/2007 | Hu et al. | |
| 2007/0073721 A1 | 3/2007 | Belyy et al. | |
| 2007/0288490 A1 | 12/2007 | Longshaw | |
| 2007/0299832 A1 | 12/2007 | Chang et al. | |
| 2008/0189269 A1 * | 8/2008 | Olsen | G06F 17/30864 |
| 2008/0215602 A1 | 9/2008 | Samson et al. | |
| 2008/0222089 A1 | 9/2008 | Stewart et al. | |
| 2008/0306920 A1 | 12/2008 | Santosuosso | |
| 2009/0216717 A1 | 8/2009 | Suereth et al. | |
| 2009/0226916 A1 | 9/2009 | DeSimas | |
| 2010/0057777 A1 | 3/2010 | Williamson | |
| 2010/0114976 A1 | 5/2010 | Castellanos | |
| 2010/0250563 A1 | 9/2010 | Wu et al. | |
| 2011/0029478 A1 * | 2/2011 | Broeker | G06F 17/30489 707/600 |
| 2011/0066602 A1 | 3/2011 | Studer et al. | |
| 2011/0119221 A1 | 5/2011 | Mishra | |
| 2011/0137940 A1 | 6/2011 | Gradin | |
| 2011/0153667 A1 | 6/2011 | Parmeter et al. | |
| 2011/0225191 A1 | 9/2011 | Xie | |
| 2011/0313979 A1 | 12/2011 | Roberts | |
| 2012/0197887 A1 | 8/2012 | Anderson | |
| 2012/0281012 A1 | 11/2012 | Neway | |
| 2012/0323927 A1 | 12/2012 | Froemmgen | |
| 2013/0159353 A1 | 6/2013 | Fuh et al. | |
| 2013/0166576 A1 | 6/2013 | Hudzia et al. | |
| 2014/0147013 A1 | 5/2014 | Shandas et al. | |
| 2015/0220838 A1 | 8/2015 | Martin et al. | |
| 2016/0232115 A1 | 8/2016 | Sawal et al. | |

FOREIGN PATENT DOCUMENTS

| | | |
|---|---|---|
| CN | 101271472 | 9/2008 |
| EP | 1302871 | 4/2003 |
| JP | 03-002938 | 1/1991 |
| JP | H07-502617 | 3/1995 |
| JP | 08-030637 | 2/1996 |
| JP | 10-055367 | 2/1998 |
| JP | 10-091633 | 4/1998 |
| JP | 10-320423 | 12/1998 |
| JP | 11-238065 | 8/1999 |
| JP | 2001-43237 | 2/2001 |
| JP | 2001-142827 | 5/2001 |
| JP | 2002-024262 | 1/2002 |
| JP | 20100072823 | 4/2010 |
| JP | 2012-038066 | 2/2012 |
| WO | 2000010103 | 2/2000 |
| WO | WO 00/57312 | 9/2000 |
| WO | WO 00/79415 | 12/2000 |
| WO | WO 03/071450 | 8/2003 |
| WO | WO 2005029369 | 3/2005 |
| WO | 20090095981 | 8/2009 |

OTHER PUBLICATIONS

English Translation of Notification of Reasons for Refusal, Japanese Application No. 2013-551372, dated Oct. 27, 2015 (3 pages).

Naumann, Felix "Data Profiling Revisited," SIGMOD Record, vol. 42, No. 4, pp. 40-49 (2014).

Lynch, C. "Canonicalization: a fundamental tool to facilitate preservation and management of digital information," D-Lib Magazine, vol. 5, No. 9, pp. 1-6 (1999).

U.S. Appl. No. 10/941,402, filed Sep. 15, 2004, U.S. Pat. No. 8,868,580, Oct. 21, 2014, Data Profiling.

U.S. Appl. No. 10/941,373, filed Sep. 15, 2004, U.S. Pat. No. 7,849,075, Dec. 7, 2010, Joint Field Profiling.

U.S. Appl. No. 10/941,401, filed Sep. 15, 2004, U.S. Pat. No. 7,756,873, Jul. 13, 2010, Functional Dependency Data Profiling.

U.S. Appl. No. 13/827,558, filed Mar. 14, 2013, Data Records Selection.

U.S. Appl. No. 13/360,230, filed Jan. 27, 2012, Generating Data Pattern Information.

U.S. Appl. No. 13/958,057, filed Aug. 2, 2013, Profiling Data With Location Information.

U.S. Appl. No. 14/059,590, filed Oct. 22, 2013, Profiling Data With Location Information.

U.S. Appl. No. 13/957,641, filed Aug. 2, 2013, Profiling Data With Source Tracking.

U.S. Appl. No. 13/957,664, filed Aug. 2, 2013, Characterizing Data Sources in a Data Storage System.

U.S. Appl. No. 14/156,544, filed Jan. 16, 2014, Database Key Identification.

(56) References Cited

OTHER PUBLICATIONS

Alur et al. "IBM Websphere Information Analyzer and Data Quality Assessment", ibm.com/redbooks, Dec. 2007 p. 1-642, Retrieved from the Internet URL:http://www.ibm.com/redbooks/pdfs/sg247508.pdf.
Apte, Chidanand, et al., "Business Application for Data Mining," Aug. 2002, Communications of the ACM, vol. 45, No. 8, pp. 49-53.
"Ascential" http://www.ascential.software.com (2003).
"Avellino" http://www.avellino.com (2003).
Bagchi et al.. "Dependency Interference Algorithms for Relational Database Design." Computers in Industry 14 (1990) 319-350.
Bell et al.. "Discovery of Data Dependencies in Relational Databases." LS-8 Report 14, Dortmund, Apr. 3, 1995 1-18.
Bell et al. "Discovery of Data Dependencies in Relational Databases" Research Reports of the Unit No. VIII (AI), Computer Science Department of Dortmund, DE, Apr. 1995, pp. 1-18.
Bitton et al.. "A Feasibility and Performance Study of Dependency Inference." Department of Electrical Engineering and Computer Science, University of Illinois at Chicago (1989) 635-641.
Brown et al.. "BHUNT: Automatic Discovery of Fuzzy Algebraic Constraints in Relational Data." $29^{th}$ VLDB Conference, Sep. 9, 2003, XP-002333907.
Bruno et al.. "Efficient Creation of Statistics over Query Expressions." The Computer Society (2003) 201-212.
Chaudhuri, S., "An Overview of Query Optimization in Relational Systems", XP-000782631, pp. 34-43 (1998).
Dasu et al. "Mining Database Structure; or, How to Build a Data Quality Browser." ACM SIGMOD 2002 Conference, Jun. 4, 2002, XP-002333902, 240-251.
"Data Profiling: The Foundation for Data Management", prepared by DataFlux Corporation, XP-002313258, (2004).
"Evoke", http://www.evokesoftware.com, (2003).
USPTO Non-Final Office Action issued for U.S. Appl. No. 10/941,401, dated Jul. 21, 2009, 32 pages.
Examination Report in Canadian Application No. 2,655,735 dated May 4, 2009, 2 pages.
Examination Report in Canadian Application No. 2,655,731 dated Dec. 3, 2009, 3 pages.
Examiner's Report in Australian Application No. 2009200294, dated Jun. 12, 2012, 3 pages.
Florescu, Daniela et al., "A Performance Evaluation of Alternative Mapping Schemes for Storing XML Data in a Relational Database," May 1999, http://www.caravel.inria.fr/Fmbrepubs_dana.html, 31 pages.
Graefe, Goetz. "Query Evaluation Techniques for Large Databases." ACM Computing Surveys, vol. 25, No. 2, Jun. 1993, 98 pages.
Henrard et al.. "Data Dependency Elicitation in Database Reverse Engineering." Institut d'Informattique, University of Namur, Belgium, (2001), 11-19.
Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.
Huhtala, Y. et al., "Efficient Discovery of Functional and Approximate Dependencies Using Paritions," Proceedings of the $14^{th}$ International Conference on Data Engineering, Feb. 23-27, 1998, pp. 392-401.
Huhtala et al., "TANE: An Efficient Algorithm for Discovering Functional and Approximate Dependencies", The Computer Journal, vol. 42, No. 2 (1999).
IBM "Profiling: Take the First Step Toward Assuring Data Quality," white paper, GC-18-9728-00, Dec. 2005.
International Search Report & Written Opinion, PCT/US2012/022905, dated May 2, 2012, 12 pages.
Jaedicke, et al., On Parallel Processing of Aggregate and Scalar Functions in Object-Relational DBMS, XP-002313223, pp. 379-389 (1998).
Jahnke et al.. "Adaptive Tool Support for Database Reverse Engineering." AG-Softwaretechnik, Universität Paderborn, Germany (19990, 278-282.
Johnson, T et al., "Comparing Massive High-Dimensional Data Sets," Proceedings of the $4^{th}$ International Conference on Knowledge Discovery and Data Mining (KDD 98), Aug. 27-31, 1998, pp. 229-233.
Kandel et al. "Profiler: Integrated Statistical Analysis and Visualization for Data Quality Assessment" AVI '12 Proceedings of the International Working Conference on Advanced Visual Interfaces, pp. 1-8, May 2012.
Kivinen, J and H. Mannila, "Approximate Inference of Functional Dependencies from Relations," Theoretical Computer Science, vol. 149, 1995, pp. 129-149.
Kouris I N et al. "Using Infolination Retrieval Techniques for Supporting Data Mining" Data & Knowledge Engineering, Elsevier BC, NL, vol. 52, No. 3, Mar. 2005, pp. 353-383.
Lee, Kyong-Ha et al., "Bitmap Indexes for Relational XML Twig Query Processing," OIKM '09, Nov. 2-6, 2009, 10 pages.
Lemire et al. "Sorting Improves Word-Aligned Bitmap Indexes" Data & Knowledge Engineering, Dec. 2009, pp. 1-43.
Li et al., "A Practical External Sort for Shared Disk MPPs", http://www.thearling.com/text/sc93/sc93.
Lopes, S. et al., "Efficient Discovery of Functional Dependencies and Armstrong Relations," Proceedings of the $7^{th}$ International Conference on Extending Database Technology (EDBT 2000), LNCS 1777, Mar. 27-31, 2000, pp. 350-364.
Mannila, Heikki, "Theoretical Frameworks for Data Mining," Jan. 2000, SIGKDD Explorations, vol. 1, No. 2, pp. 30-32.
Milne, Robert et al., "Predicting Paper Making Defects On-line Using Data Mining," Jul. 24, 1998, Knowledge-Based Systems, vol. 11, pp. 331-338.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Notification of Reason(s) for Refusal in Japanese Patent Application No. 2006-526986, dated Oct. 13, 2010, 3 pages.
Novelli, N. et al., "FUN: An Efficient Algorithm for Mining Functional and Embedded Dependencies," Proceedings of the $8^{th}$ International Conference on Database Theory (ICDT 2001), LNCS 1973, Jan. 4-6, 2001, pp. 189-203.
Office Action issued in Japanese Application No. 2010-153799, English Translation included, dated May 8, 2012, 6 pages.
Office Action issued in Japanese Application No. 2010-153800, English Translation included, dated May 8, 2012, 5 pages.
Olson, "Know Your Data: Data Profiling Solutions for Today's Hot Projects", XP-002313222, p. 1-4, published in DM Review, printed from DMReview.com (Mar. 2000).
Petit et al.. "Towards the Reverse Engineering of Denormalizes Relational Databases." Laboratoire d'Ingénierie des Systèmes d'Information, Lyon (1996), 218-227.
Rahm, et al., "Data Cleaning: Problems and Current Approaches", XP-002284896 (2000).
Summons to attend oral proceedings pursuant to Rule 115(a) EPC in EP application No. 04784113.5, dated Jul. 30, 2010, 8 pages.
Wyss et al.. "FastFDs: A Heuristic-Driven, Depth-First Algorithm for Mining Functional Dependencies from Relation Instances." (Extended Abstract) Computer Science Department, Indiana University XP-002333906 101-110.
Yan, Men in, et al., "Algorithm for discovering multivalued dependencies," 2001, ACM Proceedings of the $10^{th}$ International Conference on Infolination and Knowledge Management, pp. 556-558.
Yao, H. et al., "FD_Mine: Discovering Functional Dependencies in a Database Using Equivalences," University of Regina, Department of Computer Science, Technical Report TR 2002-04, Aug. 2002.
Yao, H. et al., "FD_Mine: Discovering Functional Dependencies in a Database Using Equivalencies," Proceedings of the $2^{nd}$ IEEE International Conference on Data Mining, Dec. 9-12, 2002, pp. 729-732.
Yao, Hong et al., "Mining functional dependencies from data," Sep. 15, 2007, Springer Science-Business Media, Data Mining and Knowledge Discovery, vol. 16, No. 2, pp. 197-219.

(56) References Cited

OTHER PUBLICATIONS

Yoon, Jong P., et al., "BitCube: A Three-Dimensional Bitmap Indexing for XML Documents," Journal of Intelligent Information Systems, 2001, 17:2/3, pp. 241-254.
Office Action issued in Japanese Application No. 2006-526986, English Translation included, dated Nov. 22, 2012, 61 pages.
Japanese Office Action, application No. 2010-153799, dated Feb. 12, 2013, 4 pages.
Mobasher, "Data Mining for Web Personalization", The Adaptive Web; LNCS 4321, pp. 90-135, 2007.
Gauch et al., "User Profiles for Personalized Information Access", The Adaptive Web, LNCS 4321, pp. 54-89, 2007.

* cited by examiner

MANAGING DATA PROFILING OPERATIONS RELATED TO DATA TYPE

CROSS-REFERENCE TO RELATED APPLICATIONS

This application claims priority to U.S. Application Ser. No. 61/949,477, filed on Mar. 7, 2014, incorporated herein by reference.

BACKGROUND

This description relates to managing data profiling operations related to data type.

Databases or other information management systems often include datasets for which various characteristics may not be known. For example, ranges of values or typical values for a dataset, relationships between different fields within the dataset, or functional dependencies among values in different fields, may be unknown. Data profiling can involve examining a dataset in order to determine such characteristics. Some techniques for data profiling include receiving information about a data profiling job, running the data profiling job, and then returning a result after a delay that is based on how long it takes to perform various processing steps involved with the data profiling. One of the steps that may involve significant processing time is "canonicalization," which involves changing the data types of the values appearing within the records of a dataset to a predetermined or "canonical" data type to facilitate additional processing. For example, canonicalization may include converting values to a human readable string representation.

SUMMARY

In one aspect, in general, a method for processing data in a computing system includes receiving, over an input device or port of the computing system, a plurality of records that each have one or more values for respective fields of a plurality of fields. The method includes storing, in a storage medium of the computing system, data type information that associates each of one or more data types with at least one identifier. The method includes processing, using at least one processor of the computing system, a plurality of data values from the records. The processing includes: generating a plurality of data units from the records, each data unit including a field identifier that uniquely identifies one of the fields and a binary value from one of the records, the binary value extracted from the field of that record identified by the field identifier; aggregating information about binary values from a plurality of the data units; generating a list of entries for each of one or more of the fields, at least some of the entries each including one of the binary values and information about that binary value aggregated from a plurality of the data units; retrieving a data type associated with a first identifier from the data type information, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

Aspects may include one or more of the following features.

The binary value extracted from the field of that record identified by the field identifier is extracted as an un-typed sequence of bits. Generating profile information for at least one of the fields based at least in part on a retrieved data type of a particular binary value appearing in the field includes reinterpreting the un-typed sequence of bits as a typed data value that has the retrieved data type.

The profile information includes type-dependent profiling results that depend on original data types of the plurality of data values from the records.

Aggregating information about binary values from a plurality of the data units includes comparing binary values from the plurality of data units with binary values in the list of entries to determine if there is a match between the binary values.

The information about that binary value aggregated from a plurality of the data units includes a total count of matched binary values that is incremented each time a match is determined when comparing the binary values.

A match between a first binary value and a second binary value corresponds a sequence of bits comprising the first binary value being identical to a sequence of bits comprising the second binary value.

The data type information associates each of one or more data types with at least one of the field identifiers.

Retrieving a data type associated with the first identifier from the data type information includes retrieving a data type associated with a first field identifier.

Each data unit includes: one of the field identifiers, a binary value from one of the records, and a data type identifier that uniquely identifies one of the data types.

The data type information associates each of one or more data types with at least one of the data type identifiers.

Retrieving a data type associated with the first identifier from the data type information includes retrieving a data type associated with a first data type identifier.

Associating the retrieved data type with at least one binary value included in an entry of one of the lists includes: instantiating a local variable having the retrieved data type and initializing the instantiated variable to a value based on the binary value included in the entry.

Associating the retrieved data type with at least one binary value included in an entry of one of the lists includes: setting a pointer associated with the retrieved data type to a memory location at which the binary value included in the entry is stored.

Each data unit includes: one of the field identifiers, a binary value from one of the records, and an indicator of the length of the binary value.

The length indicator is stored as a prefix to the binary value.

The method further includes receiving, over the input device or port of the computing system, record format information associated with the plurality of records.

The data type information is generated based at least in part on the received record format information.

The processing further includes: converting binary values from different respective entries of a first of the lists for a first field from a retrieved data type associated with the binary values to a target data type, and converting binary values from different respective entries of a second of the lists for a second field from a retrieved data type associated with the binary values to the same target data type.

In another aspect, in general, software stored on a computer-readable medium includes instructions for causing a computing system to: receive, over an input device or port of the computing system, a plurality of records that each have one or more values for respective fields of a plurality of fields; store, in a storage medium of the computing system, data type information that associates each of one or more data types with at least one identifier; and process, using at least one processor of the computing system, a plurality of data values from the records. The processing includes: generating a plurality of data units from the records, each data unit including a field identifier that uniquely identifies one of the fields and a binary value from one of the records, the binary value extracted from the field of that record identified by the field identifier; aggregating information about binary values from a plurality of the data units; generating a list of entries for each of one or more of the fields, at least some of the entries each including one of the binary values and information about that binary value aggregated from a plurality of the data units; retrieving a data type associated with a first identifier from the data type information, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

In another aspect, in general, a computing system includes: an input device or port of the computing system configured to receive a plurality of records that each have one or more values for respective fields of a plurality of fields; a storage medium of the computing system configured to store data type information that associates each of one or more data types with at least one identifier; and at least one processor of the computing system configured to process a plurality of data values from the records. The processing includes: generating a plurality of data units from the records, each data unit including a field identifier that uniquely identifies one of the fields and a binary value from one of the records, the binary value extracted from the field of that record identified by the field identifier; aggregating information about binary values from a plurality of the data units; generating a list of entries for each of one or more of the fields, at least some of the entries each including one of the binary values and information about that binary value aggregated from a plurality of the data units; retrieving a data type associated with a first identifier from the data type information, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

In another aspect, in general, a computing system includes: means for receiving a plurality of records that each have one or more values for respective fields of a plurality of fields; means for storing data type information that associates each of one or more data types with at least one identifier; and means for processing a plurality of data values from the records. The processing includes: generating a plurality of data units from the records, each data unit including a field identifier that uniquely identifies one of the fields and a binary value from one of the records, the binary value extracted from the field of that record identified by the field identifier; aggregating information about binary values from a plurality of the data units; generating a list of entries for each of one or more of the fields, at least some of the entries each including one of the binary values and information about that binary value aggregated from a plurality of the data units; retrieving a data type associated with a first identifier from the data type information, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

Aspects can have one or more of the following advantages.

Data profiling is sometimes performed by a program that provides a user interface that is dedicated to the purpose of managing the data profiling procedures. In such situations, a user may be expecting relatively long delays when profiling a large amount of data (e.g., large datasets and/or a large numbers of datasets). In some cases, it may be useful to incorporate data profiling functionality within another user interface, such as a user interface for developing data processing programs (e.g., expressed as dataflow graphs). However, if a user is in the process of developing a program for processing data, even though it may be useful to request data profiling results for a particular dataset from within that development user interface, it may not be appropriate to make the user endure long delays before obtaining those results.

Using the techniques described herein, it is possible to shorten some delays for certain data profiling procedures (e.g., especially field-level data profiling). For example, instead of having to wait 3 minutes for data profiling results, a user may only need to wait 30 seconds. One of the techniques used to provide at least some of the speed-up is based on a recognition that canonicalization and other type-dependent processing can be delayed and performed much more efficiently after other data profiling procedures that aggregate data values to be canonicalized. Processing is more efficient because it is performed on all distinct values in a field, but not necessarily all occurrences of each distinct value, which generally leads to much fewer operations (unless the field is highly populated with unique values). This technique is able to avoid redundant processing that, for a large collection of records, could potentially take a large amount of time. One of the consequences of this technique is the need to properly manage data type information that will later be used for the canonicalization and type-dependent validation, as described in more detail below.

With such reduced processing delay, it may then be appropriate to enable data profiling to be performed from within a development user interface. A user interface element (e.g., a context menu) can be incorporated into the development user interface to be displayed when a user interacts with (e.g., using a right-click action) an icon representing a dataset or a link representing a data flow, for example. The user interface element can present to the user options for initiating one or more data profiling procedures to be performed on the associated dataset or data flow. After a relatively short delay, results can be displayed in a window of the user interface. During the delay a progress bar can be displayed to indicate to the user that the wait will be relatively short. In one example scenario, if a user is expecting a particular field of a dataset to have only a fixed set of values, the data profiling results may show the user whether any unexpected values are present in the dataset. In another example scenario, a user can check to see if a field that is expected to be fully populated has any blank or null values. The user can then incorporate "defensive logic" into the program to appropriately handle any observed unexpected cases. In another example scenario, a user may want to view a summary of all data that flowed over a particular data flow in the last run of a dataflow graph.

Other features and advantages of the invention will become apparent from the following description, and from the claims.

DESCRIPTION

Figure 1:
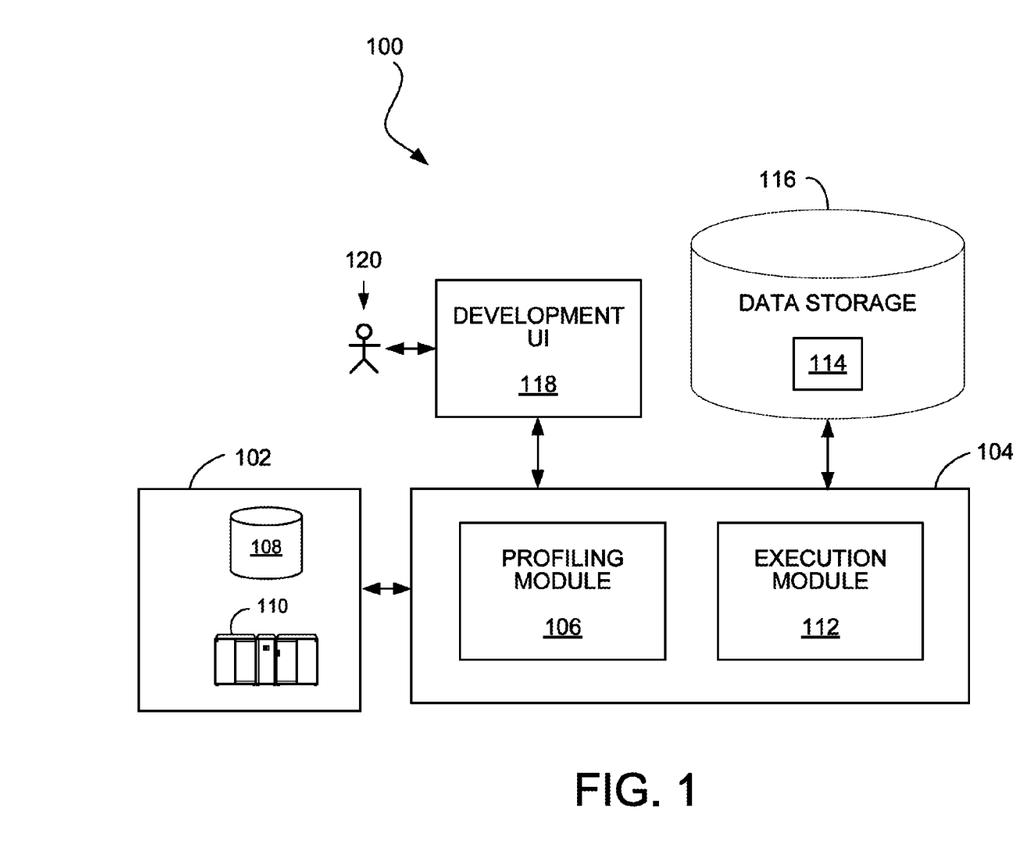
FIG. 1 is a block diagram of a data processing system.

FIG. 1 shows an example of a data processing system 100 in which the techniques to manage data type information for efficient data profiling can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a profiling module 106 and an execution module 112. The profiling module 106 performs data profiling procedures on data from the data source 102, or on intermediate data or output data generated by a data processing program that is executed by the execution module 112. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The profiling module 106 reads data from the data source 102 and stores profile information 114 generated by the data profiling procedures performed by the profiling module 106. The profiling module 106 can run on same host(s) as the execution module 112 within the execution environment 104, or can use additional resources, such as a dedicated data profiling server in communication with the execution environment 104. The profile information 114 includes results of the data profiling procedures and intermediate data compiled in the process of generating the results, such as the census data described in more detail below. The profile information 114 may be stored back in the data source 102 or in a data storage system 116 accessible to the execution environment 104, or otherwise used.

The execution environment 104 also provides a development user interface 118 with which a developer 120 is able to both develop data processing programs and initiate data profiling procedures. In some implementations, the development user interface 118 facilitates development of data processing programs as dataflow graphs that include vertices (representing data processing components or datasets) connected by directed links (representing flows of work elements, i.e., data) between the vertices. For example, such a user interface is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes). In addition to data profiling procedures being initiated from within the development user interface 118, data profiling procedures can also be performed by a profiler component in a data flow graph that has an input port connected by a dataflow link to an input dataset and an output port connected by a dataflow link to a downstream component configured to perform a task using results of the data profiling.

The profiling module 106 can receive data from a variety of types of systems that may embody the data source 102, including different forms of database systems. The data may be organized as datasets representing a collection of records that have values for respective fields (also called "attributes" or "columns"), including possibly null values. When first reading data from a data source, the profiling module 106 typically starts with some initial format information about records in that data source. In some circumstances, the record structure of the data source may not be known initially and may instead be determined after analysis of the data source or the data. The initial information about records can include, for example, the number of bits used to store an individual value, the order of fields within a record, and the data type (e.g., string, signed/unsigned integer) of a value appearing within a particular field.

Generally, records of a particular dataset all have the same record format, and all the values within a particular field have the same data type (i.e., the record format is "static"). There can be datasets with a "dynamic" record format, where each subset of records could have a different format, and/or one or more fields could have values with different data types. Some examples described herein assume a static record format, but various modifications can be made to support a dynamic record format. For example, processing could be reinitialized at the beginning of each subset of records in a dataset that have a change in the record format. Alternatively, each subset of records having the same record format could be treated as a different virtual dataset having a static record format, and results for those virtual record formats could be merged later, if necessary.

When performing data profiling, the profiling module 106 reads data from the data source 102 and stores profile information 114, which can be used to perform various types of analysis to characterize different datasets and different fields within different datasets. In some implementations, the profile information 114 includes a census of the values appearing within particular fields (e.g., selected fields of selected datasets, or all fields of all datasets). The census lists all of the distinct values within a field and quantifies the number of times each distinct value appears. In some implementations, the census data is stored in a single data structure, optionally indexed by field, and in other implementations, the census data is stored in multiple data structures, for example, one for each field.

The census data for a particular field being profiled can be organized as a list of entries, with each entry including: an identifier for the field, a value appearing within the field, and a count of a number of times that value appears in that field within the dataset. For some datasets, the count is equivalent to the number of records in which the value appears in that field. For other datasets (e.g., hierarchical datasets that contain nested vectors as values for some fields) the count may be different from the number of records. In some implementations, the census entry may also indicate whether or not the value is null. There is an entry for each distinct value, so each value in an entry is different from the values in other entries, and the number of entries is equal to the number of distinct values appearing within a field. The identifier for the field can be any value that uniquely identifies the field being profiled. For example, the fields being profiled can be enumerated by assigning each field an integer index in a range from 1 to the number of fields being profiled. Such an index can be stored compactly within the census data structure. Even if the census data for different fields are stored in separate data structures, it may still be useful to include the particular field identifier for that field within each entry of the data structure (e.g., to distinguish entries from different data structures). Alternatively, in some implementations, if the census data for different fields are stored in separate data structures, the field only has to be stored once for that data structure, and each entry is implicitly associated with that field and only includes the value and the count.

Figure 2:
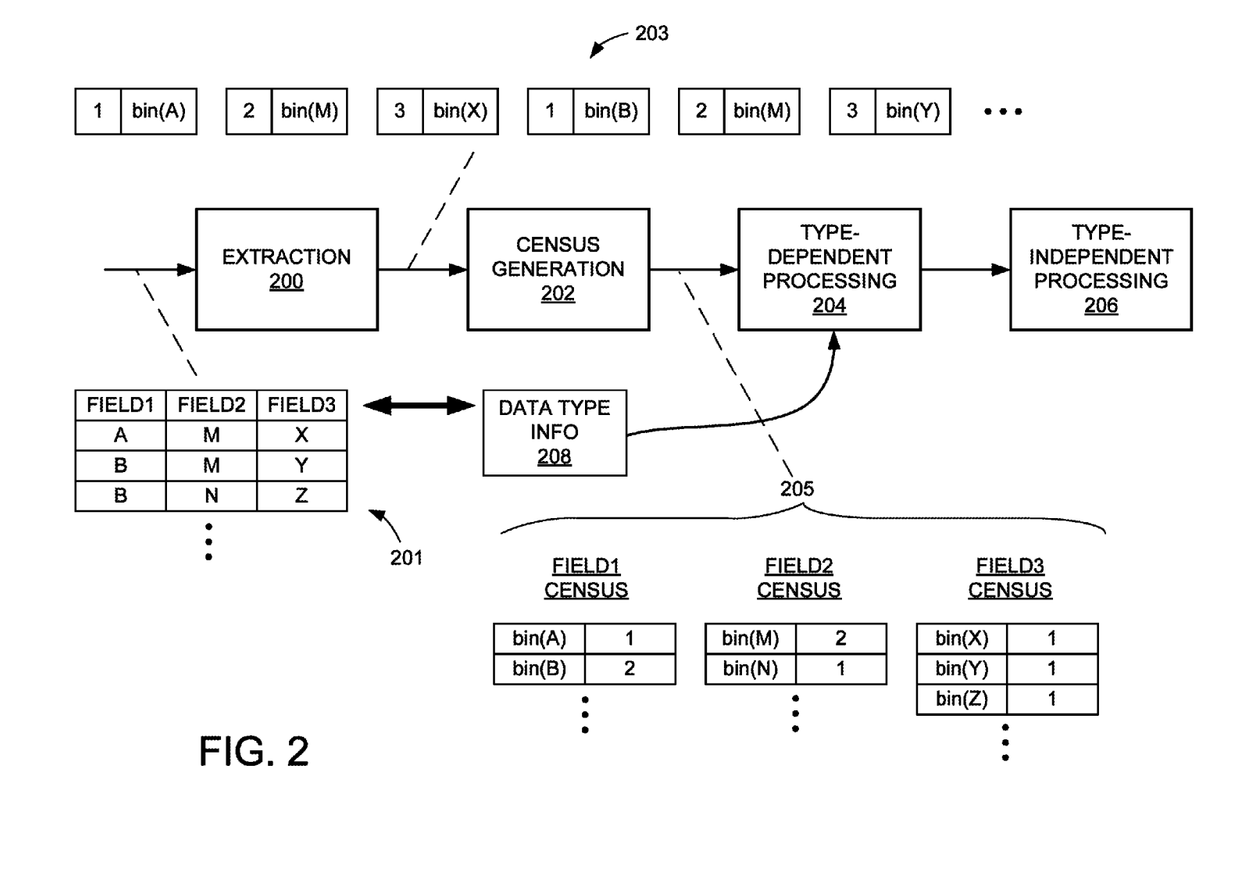
FIG. 2 is a schematic diagram of a data profiling procedure.

FIG. 2 illustrates an example of a census-based data profiling procedure performed by the profiling module 106. An extraction module 200 performs an extraction procedure for generating a stream 203 of extracted field-value pairs from a dataset being profiled, such as a table 201. In this example, the table 201 has three fields, named FIELD1, FIELD2, and FIELD3, and the first few data records in the table 201 (i.e., the first three rows) are shown with respective values for each of the three fields. A census generation module 202 processes the stream 203 of field-value pairs for generating one or more census files 205 for respective fields. A type-dependent processing module 204 associates various data types from preserved data type information 208 with the respective fields to enable type-dependent profiling results to be included in the profile information 114. A type-independent processing module 206 canonicalizes the typed data values restored by the type-dependent processing module 204, which provides data values of predetermined type to facilitate additional processing that doesn't depend on the original data type. By delaying the type-dependent processing and the canonicalization until after the census generation, a potentially large speed-up is realized since multiple instances of the same data value can be processed together (i.e., a single time for that common data value) instead of separately.

The extraction module 200 generates field-value pairs by breaking a particular data record into a series of field-value pairs that each include: a field index, and a binary data value. The field index is an index value that was assigned to a particular field to uniquely (and efficiently) identify that field (e.g., 1=FIELD1, 2=FIELD2, 3=FIELD3), and the binary data value is the un-typed (or "raw") sequence of bits representing the corresponding data value contained in the data record for that field. In this example, the first data record in the table 201 would yield the following field-value (i.e., field index, binary data value) pairs: (1, bin(A)), (2, bin(M)), (3, bin(X)) (where, for purposes of illustration, it is understood that "bin(A)" in this example represents the binary data value (i.e., sequence of bits) representing the data value "A").

The census generation module 202 aggregates binary data values from the field-value pairs in the stream 203 to produce the census files 205. All that is needed to perform the aggregation that is part of census generation is to have enough information to know whether a particular data value is the same as another data value. This matching can be performed using the raw binary data value, so no valuable processing time needs to be expended providing the data types to the census generation module 202. (In FIG. 2, the values shown in the entries of the census files 205 correspond to the first three data records in the table 201, which would be updated as field-value pairs from additional data records in the table 201 were processed by the census generation module 202.)

For a particular dataset, the field-value pairs can be inserted into the stream 203 in any order. In this example, the stream 203 includes all of the field-value pairs for a particular data record followed by all of the field-value pairs for the next data record as the data records appear in the table 201. Alternatively, the table 201 could be processed by field, such that the stream includes all of the field-value pairs for a particular field followed by all of the field-value pairs for the next field as the fields appear in the table 201. Higher dimensional datasets can also be processed in this way, with field-value pairs being added to the stream 203 based, for example, on an order that will be most efficient for reading the dataset, or for generating the census files from the resulting stream 203. The stream 203 of field-value pairs can be written into a file to be processed by the downstream census generation module 202 after all field-value pairs have been generated, or the stream 203 of field-value pairs can be provided to the down stream census generation module 202 as they are being generated (e.g., to take advantage of the resulting pipeline parallelism).

The census generation module 202 processes the field-value pairs until the end of the stream 203 is reached (e.g., as indicated by an end-of-stream record if the stream corresponds to a finite batch of data records, or a marker delimiting a unit of work if the stream corresponds to a continuous stream of data records). The module 202 performs a data operation on a field-value pair, called a "census matching operation," to determine if the binary data value in that field-value pair matches a previous binary data value from a previously processed field-value pair. The module 202 performs the census matching operation at least once for each field-value pair within the stream 203. The module 202 stores a result of the census matching operation in a data structure stored in working memory space in a memory device. If the census matching operation found a match to a previous data value, then a stored count associated with that data value is incremented. Otherwise, if the census matching operation did not find a match to a previous data value, then a new entry is stored in the data structure.

For example, the data structure may be an associative array that is able to store key-value pairs with unique keys being used to look up associated values within the array. In this example, the key is a binary data value from the field-value pairs, and the value is a count that will be incremented up to the total count for the census data. The count starts at 1 when the key-value pair is created for a field-value pair with a particular binary data value as its key that does not match any key already existing in the associative array, and is incremented by 1 every time another field-value pair has a binary data value that matches an existing key. The module 202 looks up binary data values of field-value pairs for different fields (as determined by the field index within each field-value pair) within different associative arrays, with one associative array allocated for each of the fields being profiled. In some implementations, the number of fields being profiled is known in advance, and an empty associative array (which uses only a minimal amount of storage space) is allocated for each field at the beginning of the profiling procedure.

The associative array can be implemented, for example, using a hash table or other data structure that provides efficient lookup of the keys and modification of the associated values. The binary data value used as the key of a key-value pair can store a copy of the binary data value itself or a pointer to the binary data value stored in a different location in the working memory (e.g., stored in a copy of the field-value pair). The associative array along with the stored copy of the binary data value from the field-value pair, or even the entire field-value pair itself, may then be collectively considered as the data structure storing the census matching results. In implementations in which pointers to binary data values in field-value pairs are stored in the associative array, only the first field-value pair containing a particular key needs to be stored in the working memory, and subsequent field-value pairs containing that particular key can be removed from working memory after the census matching operation.

In the examples below, these associative arrays for the fields being profiled are called "census arrays" and the key-value pairs are called "census entries" within a census array. At the end of the census generation, the census arrays generated by the census generation module 202 will store all the distinct binary data values appearing within the table 201 within separate census entries, and the total count of the number of times that binary data value appears within rows of the table 201, which represent the data records being profiled. Optionally, possibly as part of the type-dependent processing, the census arrays can be updated to store not only the raw binary data values, but also the types associated with those binary data values, so that the census entries store all the distinct typed data values appearing within the table 201. For static record formats, where all the data values in a field have the same data type, data values that are distinct before they have been typed will still be distinct after they have been typed.

The type-dependent processing module 204 enables the data profiling procedures to determine whether a particular data value is valid with respect to its original data type. For example, if the original data type of the values appearing within a particular field is defined (in a record format) as having a data type of 'date' then a valid data value for that field might have a particular string format and ranges of values allowed for different parts of that string. For example, the string format might be specified as YYYY-MM-DD, where YYYY is any four-digit integer representing a year, MM is any two digit integer between 1 and 12 representing a month, and DD is any two digit integer between 1 and 31 representing a day. Additional restrictions on valid values of type 'date' may further HI specify that certain months only allow days between 1 and 30, for example. In another example, validating data values in a field having a data type of 'UTF-8' may include checking the bytes appearing in each UTF-8 character of a data value for particular sequences of bits that are not allowed in a valid UTF-8 character. In another example, validating data values in a field having a data type of a particular mainframe format may include checking for specific characteristics that are defined by that mainframe format. The type-dependent validation checks can also include application of user-defined validation rules that depend on a data value's original data type. If a data value is found to be not valid for its data type, the type-dependent processing module 204 can flag it as invalid, which may avoid the need to perform additional processing on that data value that would have been performed by the type-independent processing module 206. Before performing such validation checks, the type-dependent processing module 204 retrieves the data types from preserved data type information 208, and associates the retrieved data types with the respective binary values included the census for a given field, as described in more detail below.

Figure 3:
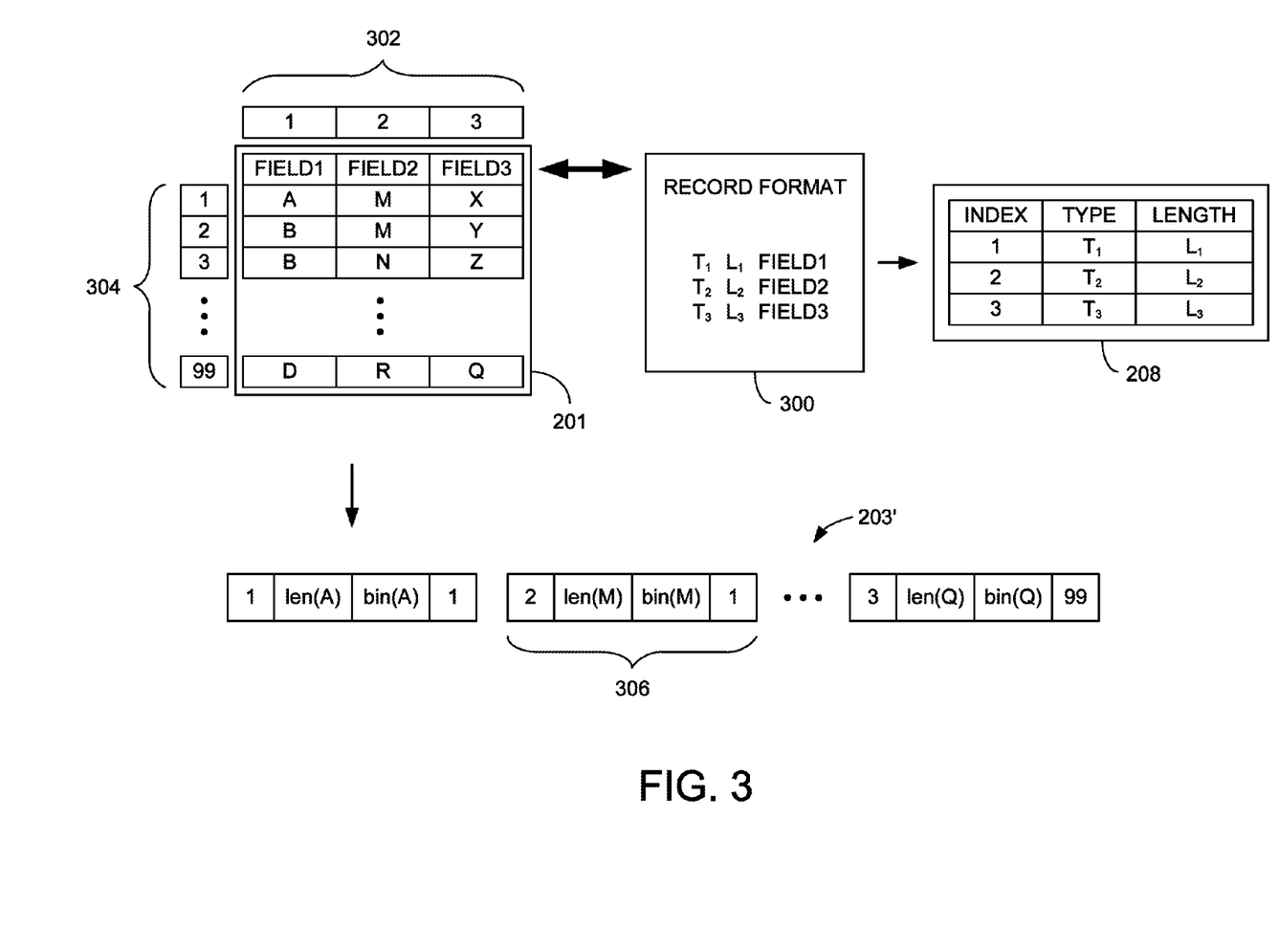
FIG. 3 is a schematic diagram of a extraction of field-value pairs and data type information.

One example of a technique for extracting binary data values and separately preserving data type information 208 for later use is illustrated in FIG. 3. The table 201 is associated with a record format 300 that describes the data types of the values appearing with the three fields of the table 201. In this example, the record format 300 is defined using a list of field declarations, as shown here:

| | | |
|---|---|---|
| $T_1$ | $L_1$ | FIELD1 |
| $T_2$ | $L_2$ | FIELD2 |
| $T_3$ | $L_3$ | FIELD3 |

The record format 300 includes a field declaration for each of the three fields of the table 201: FIELD1, FIELD2, FIELD3. For FIELDi, the field declaration includes an identifier $T_i$ of the data type of the data values in the field, an identifier $L_i$ of the length of the data values in the field, and the field name. The data type and length identifiers ($T_i$ and $L_i$) are represented symbolically in this example (for i=1 to the number of fields), but actual record formats may use any of a variety of keywords, punctuation, and other syntax elements to identify the data type and length.

An example showing how the data type and length identifiers might be specified using a particular type of syntax (i.e., a Data Manipulation Language (DML) syntax) is shown here with field declarations delimited by the terms "record" and "end;" and each ending in a semi-colon:

```
record
    string(7) FIELD1;
    int(4) FIELD2;
    decimal(10) FIELD3;
end;
```

In this example, there are three different data types: a string data type identified by the keyword "string", an integer data type identified by the keyword "int", and a floating point decimal data type identified by the keyword "decimal". This example also includes length identifiers (in unites of bytes) after the data type keyword in parentheses.

Other types of record formats can also be used. For example, in some record formats, the length of a data value is not explicitly specified in the field declaration (e.g., for variable length data values, or delimited data values). Some record formats have a potentially complex structure (e.g., a hierarchical or nested structure), which may be used, for example, to specify a conditional record format or a record format for a particular type of storage system (e.g., a COBOL copybook). This complex structure can be parsed (or "walked"), and each field can be assigned a unique field identifier.

The extraction module 200 stores data type information 208 that includes enough information about the original data types of the fields, as defined by the record format 300, so that the type-dependent processing module 204 is able to restore the original data types for type-dependent processing. For example, the data type identifiers $T_i$ and the length identifiers $L_i$ can be stored in an associative array that associates the data type identifiers and length identifiers with the corresponding field identifiers for their respective fields, as shown in FIG. 3. Optionally, additional information can also be stored in the data type information 208, such as the name of the field. The data type identifiers $T_i$ can be stored in their original form, or in a different form that preserves enough information to restore the original data type. This generation of the data type information 208 only needs to be performed once per dataset, avoiding a potentially large amount of work done by systems that extract data types along with data values when generating field-value pairs for census generation. Even if the generation of the data type information 208 is repeated multiple times (e.g., once by the extraction module 200 and again by the type-dependent processing module 204), a potentially large amount of work can still be avoided by limiting this data type extraction to a constant number of times instead of a number of times on the order of the number of records in the dataset.

If the data type information 208 is generated once by the extraction module 200, it can then stored for retrieval by (or otherwise communicated to) the type-dependent processing module 204. If instead the data type information 208 is generated by the extraction module 200 and separately by the type-dependent processing module 204 (e.g., just before it is needed), as long as the procedure for assigning index values to fields defined by the record format is the same for both, the same data type information 208 will be obtained. Whichever module generates the data type information 208, it will also use the same field index values 302 mapped to particular fields as used by the extraction module 200 for inserting field index values into field-value pairs.

The output of the extraction module 200 is a stream of elements that may optionally include other information in addition to the pair consisting of field index and binary data value. Still referring to FIG. 3, an alternative stream 203' of field-value pairs extracted from the table 201 by the extraction module 200 is made up of elements that also include a record index and a length for each binary data value. One element 306 in the stream 203' includes a field index value of "2" (corresponding to FIELD2), a length value len(M), a binary data value bin(M), and a record index value of "1" (corresponding to the first record in the table 201). The field index and binary data value are used to compile the census entries, as described above. The record index can be used to compile location information, as described below. The length value len(M), for example, may be the value 4 (e.g., encoded as a fixed length integer) that represents a length of 4 bytes for the following binary data value bin(M). The stream 203 in FIG. 2 without the lengths may be sufficient for a fixed length field of data values whose length ($L_i$) is specified in the record format and accessible to the census generation module 202 when reading the elements of the stream 203. But, if the record format does not specify a fixed length and instead allows the length of a data value to be variable, a length prefix can be included in each element, as in the stream 203'. For a blank data value, a length prefix of 0 can be used followed by no corresponding binary data value.

The census generation is generally performed to enable "field-level" profiling in which profile information characterizes values appearing in fields. In some implementations, the census generation module 202 also adds to each census entry location information that identifies, for each distinct data value, every record in the dataset in which that data value appears, which is useful for "record-level" profiling. In this example, the location information can be compiled based on record index values 304 mapped to particular records within the table 201. For example, during the generation of the census entry for an particular data value in a particular field, a bit vector has its bit locations set corresponding to integer values of the record index of every record having that data value in that field. The bit vector can be compressed to reduce storage space needed. The record index values 304 can be generated, for example, by assigning a sequence of consecutive integers to each record. The location information can then be used by the modules 204 and 206 or other data profiling procedures to compile record-level statistics and to locate (or "drill down" to) records having particular properties discovered by the data profiling (e.g., all records having a particular data value that was not expected to occur in a particular field). Compiling the location information may take additional processing time, but may not be as expensive as compiling record-level statistics by directly processing every record before the census generation.

Various techniques can be used by the type-dependent processing module 204 to associate the original data types with corresponding binary data values in the census arrays for type-dependent processing and eventual canonicalization. In some implementations, a binary data value from a census entry has its data type restored by instantiating a local variable that has the data type retrieved from the data type information 208 using the field index from that census entry. The local variable is initialized to a value corresponding to the binary data value included in the census entry (e.g., by parsing the binary data value according to the data type of the local variable). For example, the local variable may be a variable in the programming language in which the type-dependent processing module 204 is implemented (e.g., a C or C++ variable). That instantiated and initialized local variable can then be used for the processing performed by the type-dependent processing module 204. Alternatively, in some implementations, instead of instantiating a new local variable, a pointer associated with a retrieved data type can be set to a memory location at which a binary data value is stored (e.g., in a census entry). The restoration of the original data type can also be performed using a function call to invoke a processing module (e.g., a dedicated engine for interpreting DML code) to generate lines of code for reinterpreting the binary data values as typed data values. For example, the function call may be expressed as follows.

reinterpret_as(<data type identifier>,<binary data value>)

The function "reinterpret_as" invokes processing necessary to reinterpret the second "binary data value" argument as a typed data value that has a data type corresponding to the first "data type identifier" argument.

As described above, some of the type-dependent processing that is performed may include checking to determine if the data value is valid for its type. Before determining whether a data value is valid or invalid for its type, there can be a check to determine if the data value is null or is missing (indicating the field was empty for at least one record). There may be a predetermined null value (or values, such as any number of 'space' characters), which may be defined in the record format. A missing value can be indicated, for example, by a length prefix that indicates a zero length for the binary data value. In some cases, a missing value may be handled differently form a null value. Which data values are considered as null values may depend on the data type.

Canonicalization can be performed at the beginning of the type-independent processing (by the module 206), or at the end of the type-dependent processing (by the module 204). Canonicalization may include, for example, converting all data values into a data value that has a target data type of 'string'. If the data value already has a (restored) data type of 'string', then the canonicalization procedure may not perform any operations on that data value. In some implementations, the canonicalization procedure may still perform some operations even if the data value has the target data type (e.g., removing leading or trailing 'space' characters). It is possible that canonicalization will map two different data values to the same canonicalized data value. For example, a data value of "3.14" that has a data type of 'string' (from a first field) may have a trailing 'space' character removed to yield a 'string' value of "3.14", and a data value of "3.14" that has a data type of 'decimal' (from a second field) may be converted into the same 'string' value of "3.14". If two different data values from the same field (and therefore having the same original data type) are converted into the same canonicalized data value, then, in some implementations, the type-independent processing module 206 may optionally update the appropriate census array to aggregate the census entries for those two data values so that the count for the new value is the sum of the individual counts of the old values.

Figure 4:
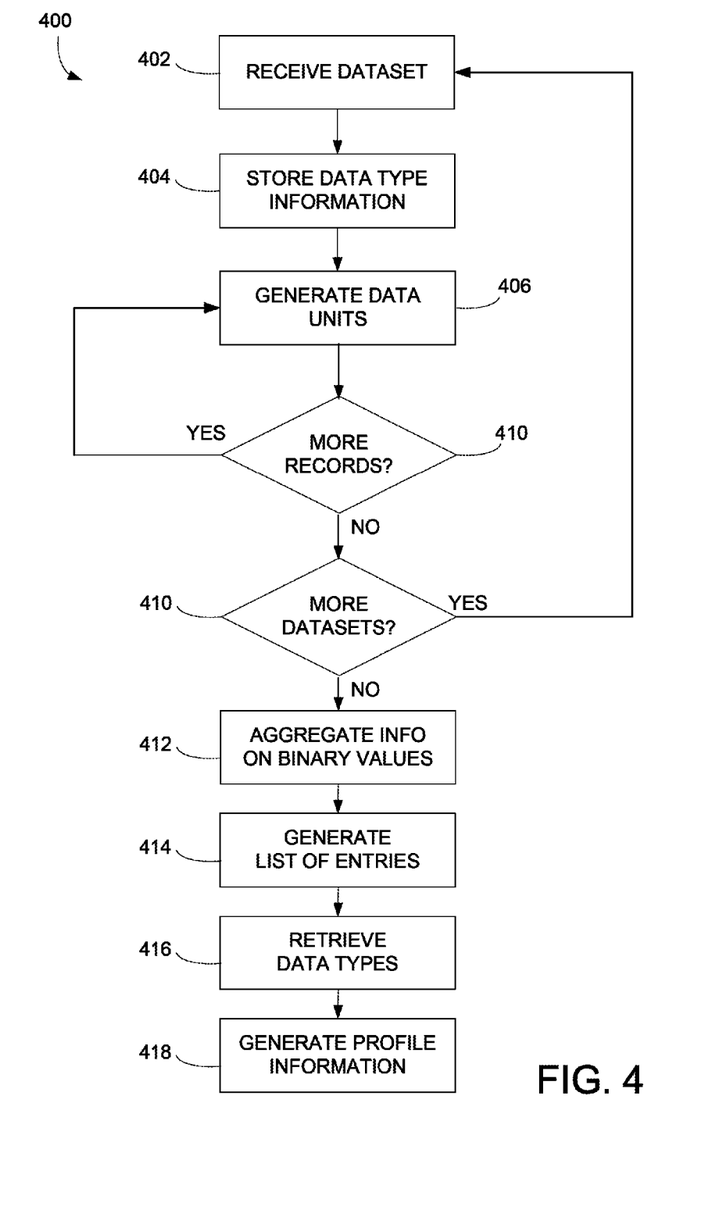
FIG. 4 is a flowchart of a data profiling procedure.

FIG. 4 shows a flowchart 400 of an example of a procedure data profiling using data type management techniques for delayed type-dependent processing and canonicalization. This flowchart represents a possible algorithm for data profiling, but is not meant to restrict what order in which certain steps may be performed (e.g., allowing for different forms of parallelism). In an outer loop, the system 100 receives (402) a dataset to be profiled, and stores (404) corresponding data type information that associates a data type with a corresponding field identifier for each field being profiled. In an inner loop, the system 100 generates (406) data units (i.e., field-value pairs) that each include a field identifier that uniquely identifies one of the fields and a binary value from one of the records. The binary value is extracted from the field of the record that is identified by the field identifier. The system 100 checks (408) to determine if there are any additional records to process as a condition for ending the inner loop, and checks (410) to determine if there are any additional datasets to process as a condition for ending the outer loop.

Potentially in parallel with the inner and outer loops (e.g., using pipeline parallelism of the modules in FIG. 2), the system 100 aggregates (412) information about binary values from a group of the data units (e.g., data units for a particular field based on the field identifiers). In some implementations, this aggregation is in the form of a census procedure in which a list of entries is generated (414) for each field being profiled. Each census entry includes a distinct one of the binary values and information about that binary value (e.g., a total count) that was aggregated from multiple data units. In a type-dependent processing phase, the system 100 retrieves (416) data types associated with respective field identifiers from the data type information, and associates each retrieved data type with the binary values included in the entries of the appropriate one of the lists (based on the field identifier). This enables the system 100 to efficiently generate (418) profile information for one or more of the fields based at least in part on a retrieved data type of a particular binary value appearing in the field, after aggregating information about binary values from multiple data units.

Along with delaying the type-dependent processing and canonicalization until after census-based aggregation, other techniques can be used in combination to further increase the efficiency of data profiling (reducing potential delays). For example, techniques can be used to efficiently spill a working memory space to overflow storage space. In some implementations, the program performing the data profiling procedure, or a portion of the program (e.g., the census generation module 202), may be given a memory limit setting a maximum amount of working memory space within a memory device that the program is allowed to use. The program may use the working memory space for storing the census arrays, which may require most of the working memory space allowed, and for storing other temporary values, which may require significantly less space than the census arrays. An overflow condition on the working memory space is satisfied when the module 202 determines that there is likely to be insufficient available working memory space to add an additional entry to the census array, or that there is no longer any available working memory space to add an additional entry (e.g., due to the last entry added). The module 202 can make this determination by measuring the total size of the census arrays (including any data values or field-value pairs referenced by pointers within the census array) and comparing this size to the memory limit (or other threshold), or by determining the amount of available working memory space left without directly measuring the total size of the census arrays (e.g., a range of memory addresses that are left from an allocated block of memory addresses).

In some implementations, the program sets an overflow threshold to detect when the total size of the census arrays is close to the memory limit. The total size of the census arrays can be measured directly, for example, by computing the sum of the sizes of the individual census arrays, where the size of an individual census array is measured as a number of bits of within the working memory space occupied by that census array. Alternatively, the total size of the census arrays can be measured indirectly, for example, by computing an amount of available space left within the working memory space. In some implementations, the program sets the overflow threshold that is just below the memory limit to reserve some space for other values. In some implementations, the overflow threshold may be equal to the memory limit, for example, if the space needed for the other values is negligible and/or the profiling module 106 does not impose strict memory limits, allowing the memory limit to be exceeded by small amounts for relatively short periods of time.

After an overflow condition has been triggered, the program uses an overflow processing procedure to store some data needed to generate the completed census arrays overflow storage space within a storage device (e.g., data storage system 116). Exactly what is stored in the overflow storage space depends on the type of overflow processing procedure that is used. U.S. Publication No. 2014/0344508, titled "MANAGING MEMORY AND STORAGE SPACE FOR A DATA OPERATION," incorporated herein by reference, describes examples of overflow processing procedures in which the program continues to perform the census matching operation for each field-value pair processed after the overflow condition has been triggered, and stores information associated with a result of the data operation (i.e., an incremented count in a census entry, or a new census entry), either in the same set of census arrays in working memory or in a new set of census arrays in working memory. If an overflow condition was triggered at some point during the processing of the field-value pairs in the stream 203, some data will be stored in the working memory space, and some data will be stored in the overflow storage space. In some cases, the data in both locations is combined in some way to generate completed census arrays. Each census array is output within its own census file 205 for processing by the type-dependent processing module 204. Since each binary data value can be extracted and stored in a census array without its associated metadata indicating its data type, the storage size of the census data can be kept small, which also reduces the chance that overflow will occur.

The techniques described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing data in a computing system, the method including:
   receiving, over an input device or port of the computing system, a plurality of records that each have one or more values for respective fields of a plurality of fields;
   storing, in a storage medium of the computing system, data type information that associates each of one or more data types with at least one identifier; and
   processing, using at least one processor of the computing system, a plurality of data values from the records, the processing including:
      generating a plurality of data units from the records, each data unit including a field identifier that uniquely identifies one of the fields and a binary value from one of the records, the binary value extracted from the field of that record identified by the field identifier;
      aggregating information about binary values from a plurality of the data units;
      generating a list of entries for each of one or more of the fields, at least some of the entries each including one of the binary values and information about that binary value aggregated from a plurality of the data units;
      retrieving a data type associated with a first identifier from the data type information, for type-dependent processing, and associating the retrieved data type with at least one binary value included in an entry of one of the lists; and
      generating profile information for at least one of the fields based at least in part on a retrieved data type of a particular binary value appearing in the field, after aggregating information about binary values from a plurality of the data units.

2. The method of claim 1, wherein the binary value extracted from the field of that record identified by the field identifier is extracted as an un-typed sequence of bits; and generating profile information for at least one of the fields based at least in part on a retrieved data type of a particular binary value appearing in the field includes reinterpreting the un-typed sequence of bits as a typed data value that has the retrieved data type.

3. The method of claim 2, wherein the profile information includes type-dependent profiling results that depend on original data types of the plurality of data values from the records.

4. The method of claim 1, wherein aggregating information about binary values from a plurality of the data units includes comparing binary values from the plurality of data units with binary values in the list of entries to determine if there is a match between the binary values.

5. The method of claim 4, wherein the information about that binary value aggregated from a plurality of the data units includes a total count of matched binary values that is incremented each time a match is determined when comparing the binary values.

6. The method of claim 4, wherein a match between a first binary value and a second binary value corresponds a sequence of bits comprising the first binary value being identical to a sequence of bits comprising the second binary value.

7. The method of claim 1, wherein the data type information associates each of one or more data types with at least one of the field identifiers.

8. The method of claim 7, wherein retrieving a data type associated with the first identifier from the data type information includes retrieving a data type associated with a first field identifier.

9. The method of claim 1, wherein each data unit includes: one of the field identifiers, a binary value from one of the records, and a data type identifier that uniquely identifies one of the data types.

10. The method of claim 9, wherein the data type information associates each of one or more data types with at least one of the data type identifiers.

11. The method of claim 10, wherein retrieving a data type associated with the first identifier from the data type information includes retrieving a data type associated with a first data type identifier.

12. The method of claim 1, wherein associating the retrieved data type with at least one binary value included in an entry of one of the lists includes: instantiating a local variable having the retrieved data type and initializing the instantiated variable to a value based on the binary value included in the entry.

13. The method of claim 1, wherein associating the retrieved data type with at least one binary value included in an entry of one of the lists includes: setting a pointer associated with the retrieved data type to a memory location at which the binary value included in the entry is stored.

14. The method of claim 1, wherein each data unit includes: one of the field identifiers, a binary value from one of the records, and an indicator of the length of the binary value.

15. The method of claim 14, wherein the length indicator is stored as a prefix to the binary value.

16. The method of claim 1, further including receiving, over the input device or port of the computing system, record format information associated with the plurality of records.

17. The method of claim 16, wherein the data type information is generated based at least in part on the received record format information.

18. The method of claim 1, wherein the processing further includes: converting binary values from different respective entries of a first of the lists for a first field from a retrieved data type associated with the binary values to a target data type, and converting binary values from different respective entries of a second of the lists for a second field from a retrieved data type associated with the binary values to the same target data type.

19. Software stored in a non-transitory form on a computer-readable medium, the software including instructions for causing a computing system to:

receive, over an input device or port of the computing system, a plurality of records that each have one or more values for respective fields of a plurality of fields;

store, in a storage medium of the computing system, data type information that associates each of one or more data types with at least one identifier; and process, using at least one processor of the computing system, a plurality of data values from the records, the processing including:

generating a plurality of data units from the records, each data unit including a field identifier that uniquely identifies one of the fields and a binary value from one of the records, the binary value extracted from the field of that record identified by the field identifier;

aggregating information about binary values from a plurality of the data units;

generating a list of entries for each of one or more of the fields, at least some of the entries each including one of the binary values and information about that binary value aggregated from a plurality of the data units;

retrieving a data type associated with a first identifier from the data type information, for type-dependent processing, and associating the retrieved data type with at least one binary value included in an entry of one of the lists; and generating profile information for at least one of the fields based at least in part on a retrieved data type of a particular binary value appearing in the field, after aggregating information about binary values from a plurality of the data units.

20. The software of claim 19, wherein aggregating information about binary values from a plurality of the data units includes comparing binary values from the plurality of data units with binary values in the list of entries to determine if there is a match between the binary values.

21. The software of claim 20, wherein the information about that binary value aggregated from a plurality of the data units includes a total count of matched binary values that is incremented each time a match is determined when comparing the binary values.

22. The software of claim 20, wherein a match between a first binary value and a second binary value corresponds a sequence of bits comprising the first binary value being identical to a sequence of bits comprising the second binary value.

23. The software of claim 19, wherein the data type information associates each of one or more data types with at least one of the field identifiers.

24. The software of claim 23, wherein retrieving a data type associated with the first identifier from the data type information includes retrieving a data type associated with a first field identifier.

25. The software of claim 19, wherein each data unit includes: one of the field identifiers, a binary value from one of the records, and a data type identifier that uniquely identifies one of the data types.

26. The software of claim 25, wherein the data type information associates each of one or more data types with at least one of the data type identifiers.

27. The software of claim 26, wherein retrieving a data type associated with the first identifier from the data type information includes retrieving a data type associated with a first data type identifier.

28. The software of claim 19, wherein associating the retrieved data type with at least one binary value included in an entry of one of the lists includes: instantiating a local variable having the retrieved data type and initializing the instantiated variable to a value based on the binary value included in the entry.

29. The software of claim 19, wherein associating the retrieved data type with at least one binary value included in an entry of one of the lists includes: setting a pointer associated with the retrieved data type to a memory location at which the binary value included in the entry is stored.

30. The software of claim 19, wherein each data unit includes: one of the field identifiers, a binary value from one of the records, and an indicator of the length of the binary value.

31. The software of claim 30, wherein the length indicator is stored as a prefix to the binary value.

32. The software of claim 19, further including instructions for causing the computing system to receive, over the input device or port, record format information associated with the plurality of records.

33. The software of claim 32, wherein the data type information is generated based at least in part on the received record format information.

34. The software of claim 19, wherein the processing further includes: converting binary values from different respective entries of a first of the lists for a first field from a retrieved data type associated with the binary values to a target data type, and converting binary values from different respective entries of a second of the lists for a second field from a retrieved data type associated with the binary values to the same target data type.

35. A computing system including:
an input device or port of the computing system configured to receive a plurality of records that each have one or more values for respective fields of a plurality of fields;
a storage medium of the computing system configured to store data type information that associates each of one or more data types with at least one identifier; and
at least one processor of the computing system configured to process a plurality of data values from the records, the processing including:
generating a plurality of data units from the records, each data unit including a field identifier that uniquely identifies one of the fields and a binary value from one of the records, the binary value extracted from the field of that record identified by the field identifier;
aggregating information about binary values from a plurality of the data units;
generating a list of entries for each of one or more of the fields, at least some of the entries each including one of the binary values and information about that binary value aggregated from a plurality of the data units;
retrieving a data type associated with a first identifier from the data type information, for type-dependent processing, and associating the retrieved data type with at least one binary value included in an entry of one of the lists; and
generating profile information for at least one of the fields based at least in part on a retrieved data type of a particular binary value appearing in the field, after aggregating information about binary values from a plurality of the data units.

36. The computing system of claim 35, wherein the binary value extracted from the field of that record identified by the field identifier is extracted as an un-typed sequence of bits; and generating profile information for at least one of the fields based at least in part on a retrieved data type of a particular binary value appearing in the field includes reinterpreting the un-typed sequence of bits as a typed data value that has the retrieved data type.

37. The computing system of claim 36, wherein the profile information includes type-dependent profiling results that depend on original data types of the plurality of data values from the records.

38. The computing system of claim 35, wherein aggregating information about binary values from a plurality of the data units includes comparing binary values from the plurality of data units with binary values in the list of entries to determine if there is a match between the binary values.

39. The computing system of claim 38, wherein the information about that binary value aggregated from a plurality of the data units includes a total count of matched binary values that is incremented each time a match is determined when comparing the binary values.

40. The computing system of claim 38, wherein a match between a first binary value and a second binary value corresponds a sequence of bits comprising the first binary value being identical to a sequence of bits comprising the second binary value.

41. The computing system of claim 35, wherein the data type information associates each of one or more data types with at least one of the field identifiers.

42. The computing system of claim 41, wherein retrieving a data type associated with the first identifier from the data type information includes retrieving a data type associated with a first field identifier.

43. The computing system of claim 35, wherein each data unit includes: one of the field identifiers, a binary value from one of the records, and a data type identifier that uniquely identifies one of the data types.

44. The computing system of claim 43, wherein the data type information associates each of one or more data types with at least one of the data type identifiers.

45. The computing system of claim 44, wherein retrieving a data type associated with the first identifier from the data type information includes retrieving a data type associated with a first data type identifier.

46. The computing system of claim 35, wherein associating the retrieved data type with at least one binary value included in an entry of one of the lists includes: instantiating a local variable having the retrieved data type and initializing the instantiated variable to a value based on the binary value included in the entry.

47. The computing system of claim 35, wherein associating the retrieved data type with at least one binary value included in an entry of one of the lists includes: setting a pointer associated with the retrieved data type to a memory location at which the binary value included in the entry is stored.

48. The computing system of claim 35, wherein each data unit includes: one of the field identifiers, a binary value from one of the records, and an indicator of the length of the binary value.

49. The computing system of claim 48, wherein the length indicator is stored as a prefix to the binary value.

50. The computing system of claim 35, wherein the input device or port is further configured to receive record format information associated with the plurality of records.

51. The computing system of claim 50, wherein the data type information is generated based at least in part on the received record format information.

52. The computing system of claim 35, wherein the processing further includes: converting binary values from different respective entries of a first of the lists for a first field from a retrieved data type associated with the binary values to a target data type, and converting binary values from different respective entries of a second of the lists for a second field from a retrieved data type associated with the binary values to the same target data type.

53. A computing system including:
- means for receiving a plurality of records that each have one or more values for respective fields of a plurality of fields;
- means for storing data type information that associates each of one or more data types with at least one identifier; and
- means for processing a plurality of data values from the records, the processing including:
  - generating a plurality of data units from the records, each data unit including a field identifier that uniquely identifies one of the fields and a binary value from one of the records, the binary value extracted from the field of that record identified by the field identifier;
  - aggregating information about binary values from a plurality of the data units;
  - generating a list of entries for each of one or more of the fields, at least some of the entries each including one of the binary values and information about that binary value aggregated from a plurality of the data units;
  - retrieving a data type associated with a first identifier from the data type information, for type-dependent processing, and associating the retrieved data type with at least one binary value included in an entry of one of the lists; and
  - generating profile information for at least one of the fields based at least in part on a retrieved data type of a particular binary value appearing in the field, after aggregating information about binary values from a plurality of the data units.

54. The software of claim 19, wherein the binary value extracted from the field of that record identified by the field identifier is extracted as an un-typed sequence of bits; and generating profile information for at least one of the fields based at least in part on a retrieved data type of a particular binary value appearing in the field includes reinterpreting the un-typed sequence of bits as a typed data value that has the retrieved data type.

55. The software of claim 54, wherein the profile information includes type-dependent profiling results that depend on original data types of the plurality of data values from the records.

* * * * *